(12) United States Patent
Douglass et al.

(10) Patent No.: US 7,895,264 B2
(45) Date of Patent: Feb. 22, 2011

(54) STORAGE CLUSTER SERVER NETWORK

(75) Inventors: Michael Douglass, Austin, TX (US);
Jonah Yokubaitis, Austin, TX (US);
Douglas Swarin, Austin, TX (US);
Edward Henigin, Austin, TX (US);
Philip Molter, Austin, TX (US)

(73) Assignee: YHC Corporation, Austin, TX (US)

( * ) Notice: Subject to any disclaimer, the term of this patent is extended or adjusted under 35 U.S.C. 154(b) by 831 days.

(21) Appl. No.: 10/892,071

(22) Filed: Jul. 15, 2004

(65) Prior Publication Data

US 2006/0015555 A1    Jan. 19, 2006

(51) Int. Cl.
*G06F 15/16* (2006.01)
*G06F 9/46* (2006.01)

(52) U.S. Cl. .................. 709/203; 709/213; 709/217; 709/249; 718/102; 718/105; 718/106

(58) Field of Classification Search .............. 709/203, 709/206, 214, 217, 219, 226, 229, 249; 718/102, 718/105, 106
See application file for complete search history.

(56) References Cited

U.S. PATENT DOCUMENTS

| | | | |
|---|---|---|---|
| 6,546,488 B2 * | 4/2003 | Dillon et al. ................. | 713/181 |
| 6,564,233 B1 * | 5/2003 | Fleischman .................. | 707/203 |
| 6,715,050 B2 * | 3/2004 | Williams et al. ............ | 711/164 |
| 6,760,765 B1 * | 7/2004 | Asai et al. .................... | 709/226 |
| 7,028,096 B1 * | 4/2006 | Lee .............................. | 709/231 |
| 2001/0054084 A1 * | 12/2001 | Kosmynin ................... | 709/218 |
| 2003/0131076 A1 * | 7/2003 | Nelson et al. ................ | 709/219 |
| 2003/0159084 A1 * | 8/2003 | Murphy et al. ............... | 714/13 |
| 2004/0122910 A1 * | 6/2004 | Douglass et al. ............ | 709/214 |

OTHER PUBLICATIONS

Horton, M., and Adams, R., Standard for Interchange of USENET Messages Dec. 1987, Network Working Group RFC 1036, pp. 1-19, http://www.rfc-editor.org/rfc/rfc1036.txt.*

* cited by examiner

*Primary Examiner*—David Lazaro
*Assistant Examiner*—Farzana Huq
(74) *Attorney, Agent, or Firm*—DLA Piper LLP (US)

(57) ABSTRACT

A clustered server network for receiving, storing and retrieving usenet articles. The clustered server network includes various sets of clustered servers. One set of clustered servers receives articles from peer usenet networks, while another set of clustered servers stores only header information for each unique article. A third set of clustered servers may be dedicated to storing, in a redundant fashion, each unique article. The articles are stored based on a deterministic calculation so that each unique article stored is found in at least one particular server(s). The redundant storage of each unique article eliminates a need for a backend server cluster for storing one copy of every article. A usenet system provides for continuous operation even if any server in any cluster becomes non-operational. A server rebuild function is provided in the usenet system.

36 Claims, 9 Drawing Sheets

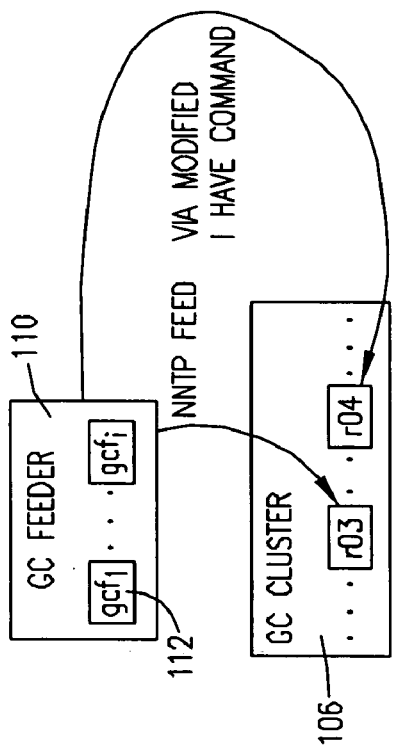
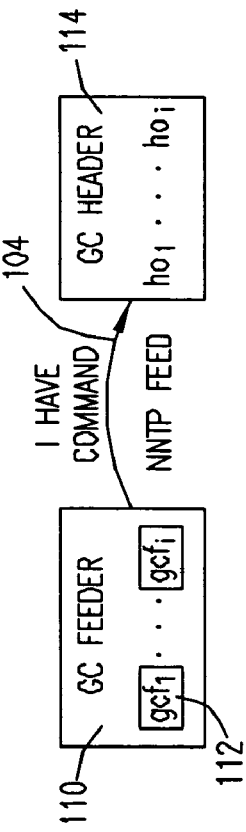
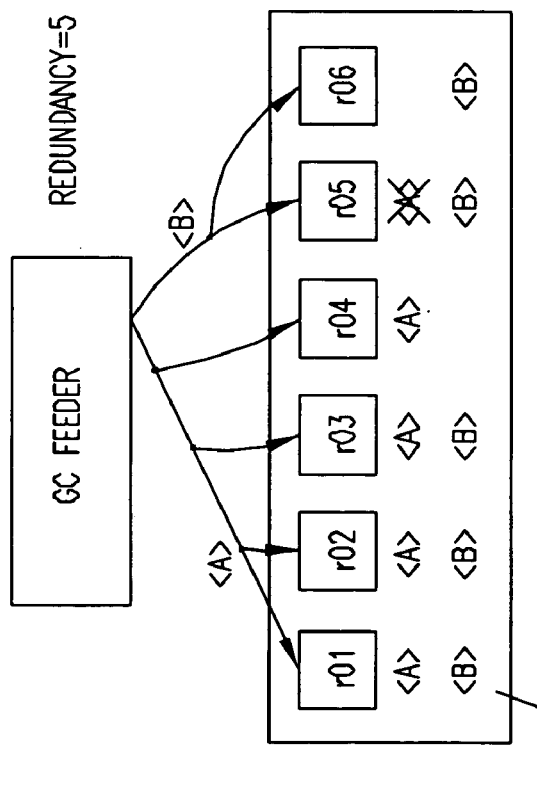

STORAGE CLUSTER SERVER NETWORK

BACKGROUND OF THE INVENTION

1. Technical Field of the Invention

The present invention relates to usenet servers, and more specifically, the present invention relates to clustering servers such that storage and retrieval of usenet articles or other data is performed without the use of a backend server.

2. Description of Related Art

Usenet server systems provide news services to clients. Conventionally, usenet backend servers have been located remotely from the service providers that provide usenet news services requested by clients. Due to the remote location of the usenet backend servers, news services have traditionally been slow and require a large amount of bandwidth between the usenet service provider and the usenet backend servers. A setup incorporating usenet backend servers is both expensive and inefficient. Thus, what is needed is a usenet server capable of providing news services at an increased speed and with reduced costs.

BRIEF DESCRIPTION OF THE DRAWINGS

A more complete understanding of the methods and apparatus of embodiments of the present invention may be obtained by reference to the following Detailed Description when taken in conjunction with the accompanying Drawings wherein:

FIG. 6 depicts articles having a variable redundancy depending on the article age;

FIG. 7 depicts a dependent interaction between the feeder cluster and a cluster server;

FIG. 8 depicts a method of storing an article header in the header cluster;

DETAILED DESCRIPTION OF THE EMBODIMENTS OF THE INVENTION

Embodiments of the present invention will now be described more fully hereunder with reference to the accompanying drawings, in which various embodiments of the invention are shown. This invention may, however, be embodied in many different forms and should not be construed as limited to the embodiments set forth herein; rather, these embodiments are provided so that this disclosure will be thorough and complete, and will fully convey the potential scope of the invention to those skilled in the art.

Figure 1:
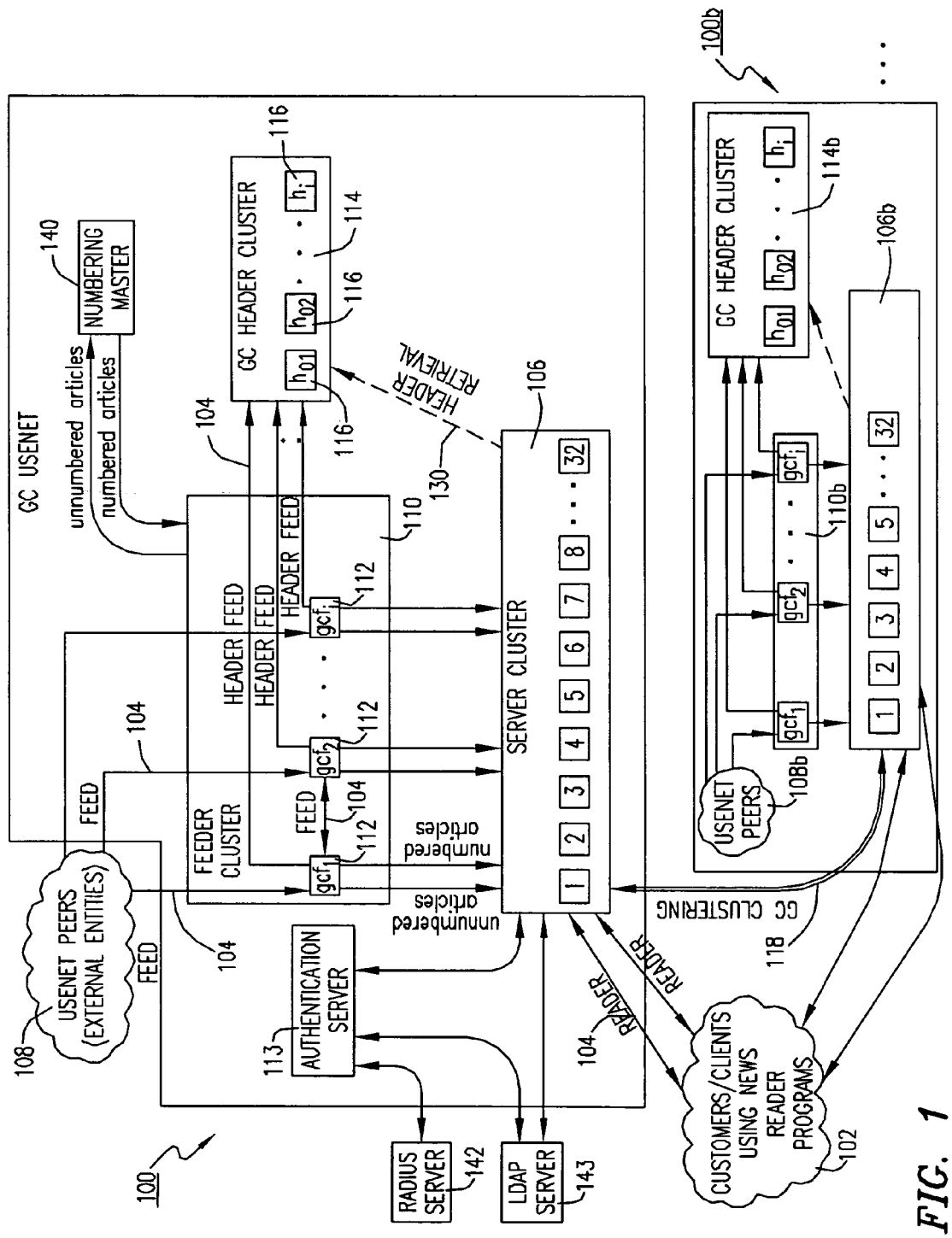
FIG. 1 is a block diagram of an exemplary usenet cluster of servers ("a gigacluster") in accordance with an embodiment of the present invention.

Referring to FIG. 1, exemplary giga clusters 100 and 100b each operating as a usenet server system are shown. Customers or clients 102, who are each using a news reader program or an application to retrieve and read news articles, are connected to giga cluster 100 via standard NNTP (Network News Transfer Protocol) connections 104. The customers 102 can be a few to any number of customers who are connected to the internet, an Internet Service Provider (ISP), or by any other means for connecting to a usenet service.

A server cluster 106 is established having a plurality of cluster servers (e.g., 1-32). The number of cluster servers depends on the amount of total storage space and throughput required by the server cluster 106 to meet the needs of the customers 102. Each cluster server, 1-32 can be a commodity server or substantially a standard server having memory, processor(s), and hard drives. It is understood that one or more of the cluster servers 1-32 in the server cluster 106 may have additional components or upgraded devices when compared with the other cluster servers in the server cluster 106, but in essence each cluster server 1-32 is configured basically the same. For example, the different servers 1-32 each may have different speed microprocessors, differing size or speed hard drives, upgraded electronics, etc., when compared to each other. Again, although FIG. 1 depicts cluster servers 1-32, there can be substantially any number of cluster servers operating in giga cluster 100. Each cluster server 1-32 in the server cluster 106 is connected or in electrical or optical communication with each one of the other cluster servers 1-32 in the server cluster 106.

The customers 102 request to view and read articles. Exemplary embodiments of the present invention may consider an article or data article to be one or any combination of data files that include video clips, music, pictures, software, text, news, fonts, data bases and/or related attachments thereto stored in one or more of the exemplary cluster servers 1-32. A discussion of how an article, data article or other data item is retrieved from the giga cluster (i.e. a clustered server network) 100 is discussed later.

Usenet peers 108, providers, users, and sharers of usenet data or data articles, are connected to an exemplary clustered server network 100. The usenet peers 108 connect to a feeder cluster 110 via, at least, an NNTP feed 104 or other suitable connection(s). The usenet peers 108 may provide usenet data to the giga cluster 100 or may be provided usenet news data from the giga cluster 100 (not specifically shown). Where the usenet peers 108 are providing usenet data to the exemplary giga cluster 100, the usenet data is received by a feeder cluster 110. The usenet data may comprise usenet files. Each file may be an article plus a header (i.e. data plus metadata) Furthermore, an embodiment of the present invention may not be limited to being used in a usenet related situation wherein NNTP protocol feeds are used. An exemplary embodiment may incorporate or use other suitable communication protocols other than NNTP, including, but not limited to, FTP, SMTP, POP3, IMAP, HTTP, and HTTPS protocols and reasonable derivations thereof.

The feeder cluster 110 consists of a plurality of feeder servers 112. Unlike previous usenet systems, the feeder cluster 110 provides feeds from the usenet peers 108 directly into the server cluster 106. Previous usenet systems fed data and articles from usenet peers directly to backend servers that are dedicated to storing usenet articles and retrieving articles.

Each feeder server 112 is in communication with the other feeder servers 112 within the feeder cluster 110 via an NNTP feed 104. Having each feeder server 112 communicate with the other feeder servers 112 provides the ability for all the feeder servers 112 to work together and share the volume of article data flowing through the feeder cluster 110. Load balancing techniques can be used to share the load and flow of articles among the feeder servers. By allowing the feeder cluster 110 to deliver new articles, from other usenet peers 108, directly into the server cluster 106 there is no need for a backend server because all the articles in an exemplary usenet system can be stored in the server cluster 106.

The feeder cluster's feeder servers 112 are also in communication with a header cluster 114 via NNTP 104 connections. The headers (i.e. metadata) of each article, stored in the server cluster 106, are stored in one or more header servers 116 in the header cluster 114. An exemplary usenet system stores the header for each article in the header cluster 114 separately from its associated article stored in the server cluster 106. The header cluster 114 comprises a plurality of header servers 116 that cooperate with each other in order to systematically store and retrieve the header information for each article stored in the server cluster 106.

Still referring to FIG. 1, giga cluster 100b is substantially the same as giga cluster 100 in configuration and operation. Giga cluster 100b comprises a server cluster 106b, a feeder cluster 110b, a header cluster 114b and NNTP connections to usenet peers 108b. The giga cluster 100b may be geographically located a great distance from giga cluster 100. Multiple giga clusters (100, 100b, 100c . . . 100i) can be clustered via various NNTP or other appropriate giga cluster clustering connections 118. This is important to embodiments of the invention because scaling of each giga cluster and multiple giga clusters is made simple. Each exemplary giga cluster has similar components and operates on substantially the same or compatible software. Each cluster (header, feeder or server cluster) is independently expandable or contractable (scalable) by adding or removing servers in the selected cluster. Each server in all the clusters is similar in hardware configuration and software configuration. The only main differences between exemplary servers in the various clusters is the portion of software that the server is operating (the selected software configuration) and potentially the amount of disk or storage space thereon. Adding or removing a server to any cluster of servers within the giga cluster 100 is almost as simple as configuring the server being added to operate as a feeder, header, or cluster server and connecting it to the cluster. An exemplary usenet system may allow for hot pluggable servers and may be able to configure the necessary connections to the additional plugged server and how it relates to the cluster of servers it is placed in.

Figure 2:
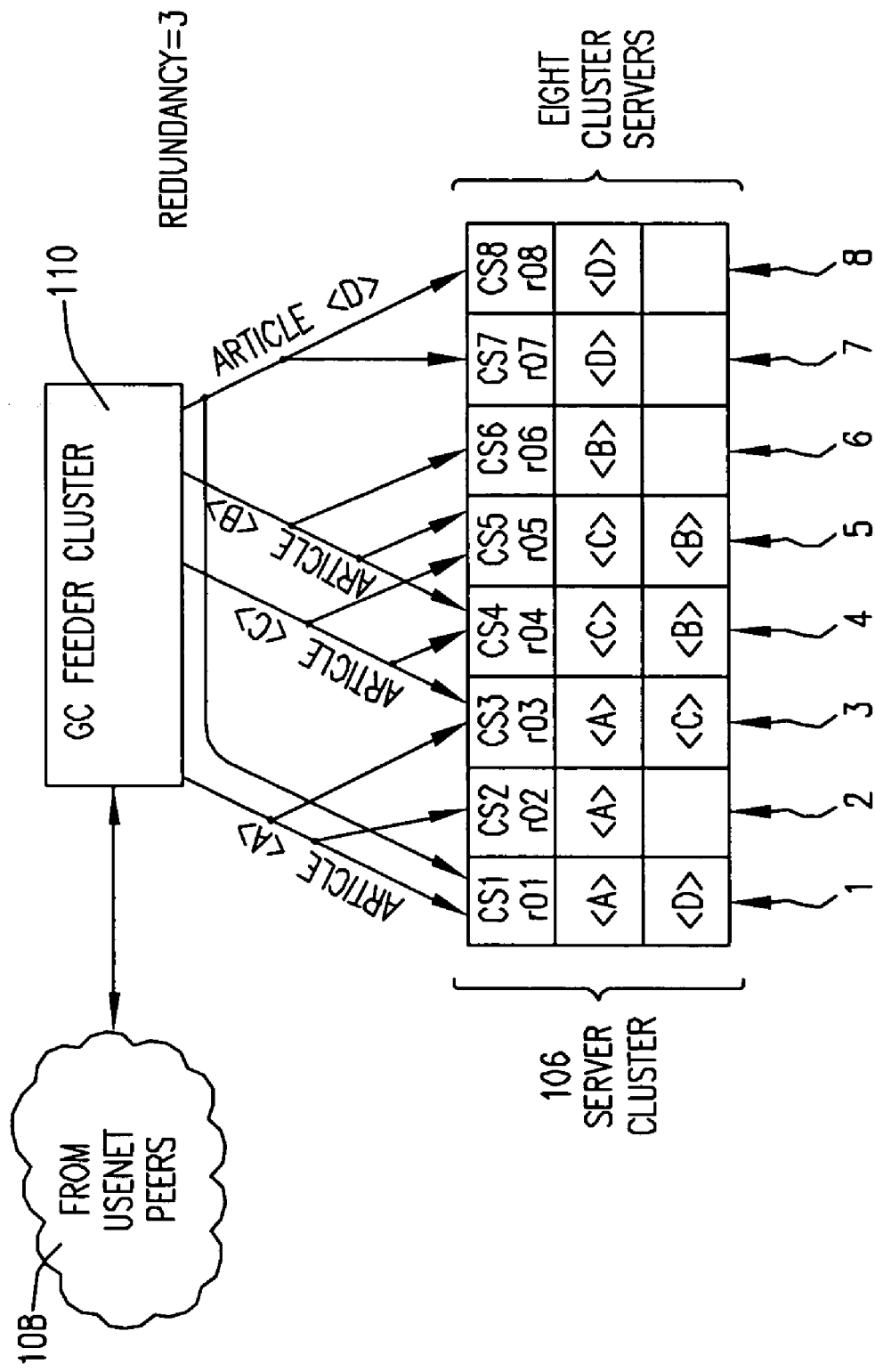
FIG. 2 is a block diagram depicting an exemplary feeder cluster adapted to redundantly feed articles for storage in more than one cluster server located in the server cluster.

Referring now to FIG. 2, a more detailed diagram depicts how the feeder cluster 110 provides articles to the cluster servers 1-8 (CS, or real server) for storage. External usenet peers 108 are entities that have an information or article exchange agreement with, for example, the owners of the exemplary giga cluster 100. Furthermore, a giga cluster 100b located in a geographically diverse location from giga cluster 100 can establish a peer relationship between the two (or more) giga clusters.

A peer sends data or an article to a feeder cluster 110. The feeder cluster can disseminate and share the article with every feeder server 112 in the feeder cluster 110. The feeder cluster 110 may also present or share the externally fed data or article with other external peers 108.

In prior-art-usenet systems, having a traditional setup, every article that is received for a particular usenet newsgroup was sent to a particular server (backend server) that stored and handled articles for that particular usenet newsgroup.

Embodiments of the present invention receive an article from a usenet peer 108 at the feeder cluster 110. A split feeding technique is used to redundantly provide and store the article on one or more cluster servers. Each article is provided to the cluster servers for storage without regard to the newsgroup or groups that the article is posted to. Referring to FIG. 2, the feeder cluster 110 is populating each article <A>, <B><C>, and <D> three times in the server cluster 106. Cluster servers 1-8 (CS1-CS8) are shown. The servers may also be referred to as real servers (r01-r08). Article <A> is stored redundantly on cluster servers 1, 2, and 3. Article <B> is stored on cluster servers 4, 5, and 6. Article <C> is stored in cluster servers 3, 4, and 5. And article D is stored in cluster servers 1, 7, and 8.

Each article is assigned a primary cluster server to be fed to and stored on. The primary cluster server, for example, for article <A> is cluster server 1. In an embodiment of the invention, the primary cluster server for an article is chosen by hashing the article's message-id, dividing the hash result by the number of servers in the server cluster 106 and taking the whole number remainder plus one as the server number of the primary server for the article. There are other ways to randomly or deterministically select which one of the cluster servers (i.e., 1-8) will be the primary cluster server for a particular article. The exemplary technique provides a deterministic primary cluster server for a given article every time the algorithm is used. For this purpose a random selection algorithm is not desirable.

For example, suppose the hash of an article's message-id (which is a unique number) is equal to 55 and there are 32 cluster servers in the server cluster 106. Fifty-five (55) divided by thirty-two (32) equals one (1) with a remainder of twenty-three (23). Twenty-three (23) plus one (1) equals 24. Therefore server twenty-four (24) is the primary cluster server for the article.

This or another deterministic technique for choosing a primary cluster server enables multiple feeder servers that receive the same article from one or more usenet peers to attempt to store the articles in the same cluster server. If the article is already stored, no additional storage is necessary. This technique prevents saving the same article multiple times even though it has already been stored or saved.

The server cluster 106 is programmed or selectively configured with a redundancy value. The redundancy value indicates how many cluster servers will store each article. FIG. 2 depicts a server cluster 106 with a redundancy of three. The redundancy value can be a number from one, having no redundancy, to a large number providing a superfluous amount of redundancy. Preferably the redundancy value is set between 2 and 10 and is based on the reliability of the giga cluster devices, the age or popularity of an article and other possible factors.

An article is first stored in its determined primary cluster server, then the feeder cluster feeds the article to the next cluster server and perhaps the next cluster server and so on until the number of servers storing the article is equal to the redundancy value. Each cluster server stores the order in which it was fed the article such that the server can determine which redundant copy/number of the article it is storing. The redundancy can also be performed in other exemplary embodiments by skipping one or more consecutive cluster servers such that for example, every other or every fourth cluster server stores a redundant article <A>. This may be done to overcome potential power supply issues of servers. For example, multiple cluster servers may be powered by a single protected power source. If a power source fails, then other cluster servers that are numerically distant from the failed power supply may not be affected. In this embodiment there is a redundancy value and a skip value stored with each article as metadata. The redundancy value indicates how many cluster servers are to store each article and which number of the redundant articles is stored; the skip value indicates the number of cluster servers to skip between each cluster server that stores the article.

An exemplary feeder cluster 110 also achieves another important task. By having multiple feeder servers (gcf$_1$, through gcf$_i$) 112 the data/article throughput of the feeder cluster is greatly enhanced. The operation of moving articles from the usenet peers to the cluster servers can be divided substantially between the numerous feeder servers 112. Load balancing techniques can be used to disperse the throughput among the feeder servers. For example, if a single feeder server has a throughput of 1000 megabits/sec, then a feeder cluster having 7 feeder servers will have substantially seven times 1000 megabits/sec. By having multiple cluster servers that store articles based on a deterministic algorithm rather than article news-group-content based rules, the high throughput can be absorbed by the cluster servers; all the articles can be stored and logged without data bottle neck problems caused the feeder cluster 110 being unable to move all the articles to a prior art backend server.

Another asset of storing an article, for example, with a redundancy of 3, is that if a cluster server crashes there is no loss of data. Furthermore, at least one-third of a crashed cluster server's data can be found on any 2 adjacent numbered cluster servers, for example, if there are 6 cluster servers and the redundancy value is 3. Then if the fourth cluster server crashes all of the information that was on the fourth server can be located on cluster servers 2, 3, 5, and 6. If both the fourth and fifth cluster servers crash, then all the lost information of server 4 can be found on cluster servers 2, 3 and 6 and all the lost information of cluster server 5 can also be found on cluster servers 1, 3 and 6. An embodiment of the present invention with a redundancy value of 3 can therefore sustain two adjacent cluster server failures without any data or article loss.

Prior art usenet systems require the feeding portion of its usenet system to store any articles regardless of its existence in the destination server (back end server) into the feeding server's local storage. This technique is not used in exemplary embodiments of the invention.

In exemplary embodiments of the present usenet storage and retrieval system, the feeder cluster incorporates a new technique in usenet systems that will be referred to as intelligent backlogging. Intelligent backlogging uses a configuration value called a minimum redundancy value. The minimum redundancy value sets the minimum number of cluster servers that need to have an article copy stored therein. If the article is stored on a number of cluster servers that is at least equal to the minimum redundancy value, then the feeder server handling an inbound article does not have to locally store the article so the article can be resent to additional cluster servers for redundant storage.

Figure 3A:
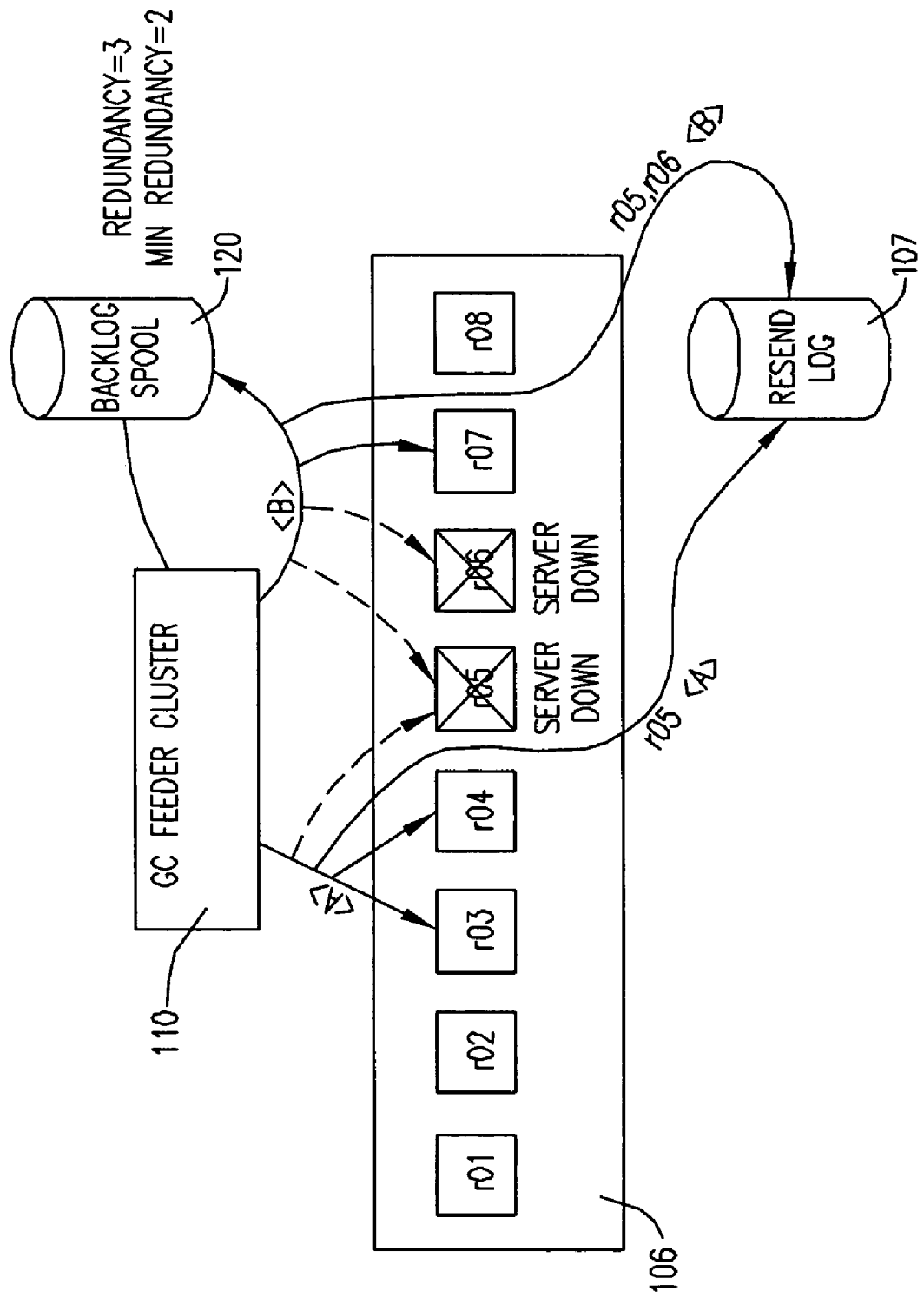
FIG. 3A is a block diagram depicting an exemplary feeder cluster performing back logging of an article in order to meet minimum redundancy requirements.

For example, in FIG. 3A an exemplary feeder cluster 110 is providing articles to cluster servers 1-8 (r01-r08). Cluster servers 5 and 6 are down and not operational at the moment. Cluster servers 5 and 6 are deemed to have crashed such that the data and articles stored therein are considered to be lost and unreliable. Article <A> has been received by the feeder cluster 110 and is being stored with a redundancy value of 3 and a minimum redundancy value of 2. Article <A> is thus stored, in accordance with an embodiment of the invention, in cluster servers 3 and 4, but when attempting to store article <A> in cluster server 5, which is down, the feeder cluster 110 checks the minimum redundancy value of 2 and determines that since the article is stored in two cluster servers (3 and 4) the minimum redundancy requirement is met for article <A> and there is no need to store article <A> locally on a feeder server for future sending or resending to cluster server 5 which did not receive the article because the minimum redundancy requirement is met. Only the message-id of article <A> is stored in a resend log on the feeder cluster 106. The resend log 107 is checked when a down/crashed cluster server becomes newly operational. The feeder cluster 106 checks the resend log and transmits the articles that the newly operational cluster server, e.g. cluster server 4, should have received. The cluster server will attempt to retrieve the article from a peer cluster server, e.g. cluster server 3 or 5.

If fewer than the minimum redundancy number of cluster servers are available to store an article, then the article is stored on a local disk (a backlog disk 120) of the feeder server that is attempting to send and have the article stored the requisite number of redundant times in the server cluster 106. When the cluster server(s) that did not receive the article come back online, the feeder cluster 110 will tell the newly operational cluster server what messages it needs. The newly operational cluster server(s) first attempt to get any missing articles from its cluster server peers that may be already storing the article. If the cluster server is unable to retrieve the article from a peer cluster server, then a feeder server in the feeder cluster 110 reads the article from its local storage disk or backlog spool 120 so the article can be sent to the needy cluster server.

Looking again at FIG. 3A, article <B> is being sent from the feeder cluster 110 to cluster servers 5, 6, and 7 (r05, r06, r07). Cluster servers 5 and 6 are down. The feeder server can only provide article <B> to cluster server 7. Fewer than the minimum redundancy number of cluster servers are storing article <B>. The minimum redundancy requirement of 2 has not been met because article <B> has only been stored on cluster server 7. Article <B> is then stored in the local backlog spool 120 or other local feeder cluster storage location. As each cluster server 5 and 6 come back up and online, they are instructed by the feeder cluster 110 to first try to get articles that should be stored thereon from a peer cluster server. If the newly online cluster server indicated to the feeder cluster 110 that it could not get the article from a peer cluster server, then the feeder cluster 110 will read the needed article from a local disk 120 and send it to the requesting cluster server.

Metadata associated with each article fed from the feeder cluster 110 to the server cluster 106 is stored in time ordered files known as rebuild logs. For each article's metadata the rebuild logs stores, at a minimum, the article's message-id and the address of the cluster server(s) that the article is stored in.

It is noted that if a lot (more than two) of cluster servers go down, then many articles will be backlogged to the backlog spool 120 while and the minimum redundancy is not met by the real cluster servers (r01-r08). This situation, or one similar to it, can create a problem at the backlog spool 120 because so many articles may have to be written to the backlog spool 120. A bottle neck may occur there as articles wait to be backed up on the backlog spool 120.

Figure 3B:
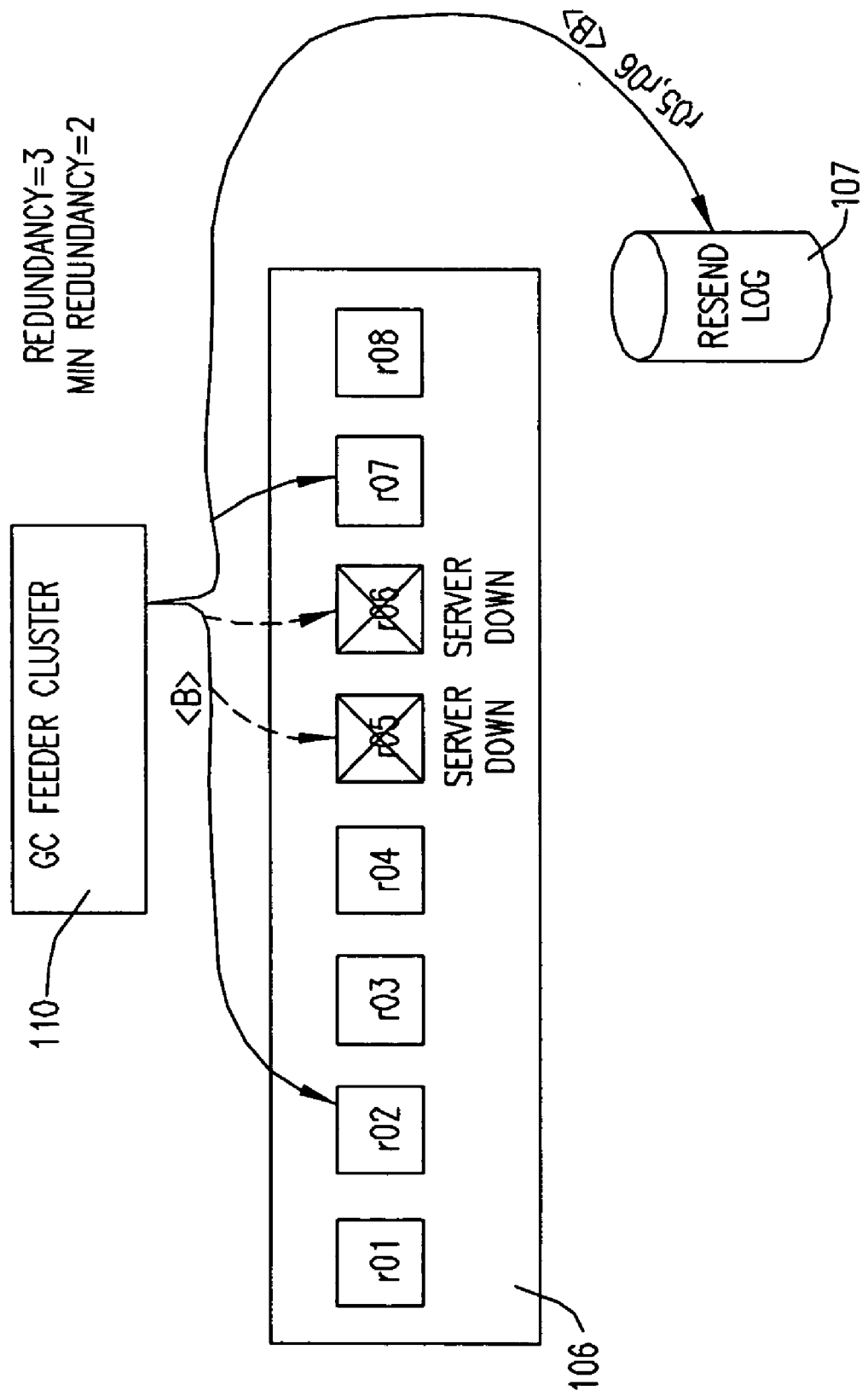
FIG. 3B is a block diagram depicting an exemplary feeder cluster performing back logging of an article without the use of a backlog spool.

In another embodiment of the invention, the potential backlog at the backup spool 120 is eliminated. The cluster servers can be used as virtual backlog spools. Referring now to FIG. 3B, assume the redundancy for the giga cluster is set to three and the minimum redundancy is set to two. Article <B>, like in FIG. 3A, is to be copied to cluster servers r05, r06, and r07, but cluster servers r05 and r06 are down. Since the minimum redundancy requirement of two cannot be met by only copying article <B> into cluster server r07, another cluster server must be selected to store article <B> until one of the cluster servers r05 or r06 come back up. A determinalistic algorithm can be used to direct storage of article <B> into another cluster server, for example cluster server r02. Cluster server r02 is being utilized as a virtual backup spool. Now r02 and r07 are storing article <B> and the minimum redundancy requirement is met.

Still referring to FIG. 3B, at a later time when one of cluster servers r05 or r06 come back up, the "resend" function, which is run on the feeder cluster tells the now online server (i.e. cluster server r05) to retrieve the article(s) that it missed while being down. The newly up cluster server, r05, is instructed to copy, for example, article <B> from cluster server r02. When the minimum redundancy is met on the requisite cluster servers that should be storing the article r05, r06, r07), then the redundant copy of the article, article <B>, can be deleted or written over on the virtual backup spool (r02).

Figure 4:
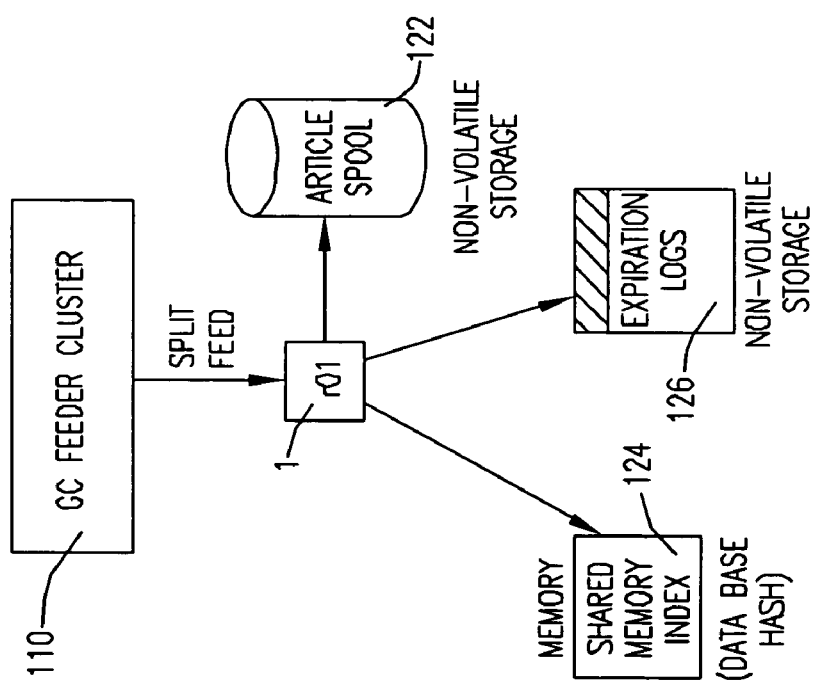
FIG. 4 depicts a block diagram of the storage of articles and the expiration of articles from the perspective of a single cluster server in accordance with an embodiment of the present invention.

To add more specificity to the process of storing articles in an exemplary giga cluster system 100, FIG. 4 depicts a feeder cluster providing an article to cluster server 1. When the article is fed to cluster server 1, the entire article is stored on a storage medium (hard drive, flash drive, tape drive, optical drive, other mass storage devices) acting as the article spool 122 with cluster server 1. The article spool is generally located within cluster server 1 (i.e., the cluster server receiving the article). The article's metadata is stored in both a memory index 124 and a non-volatile storage log called an expiration log 126. The memory index 124 is used for fast retrieval of metadata for the stored articles. The expiration log 126 is generally stored on non-volatile memory such as a disk drive, optical drive, flash memory, or other non-volatile storage medium and are generally located on each cluster server. The expiration logs contain important metadata used for storage, tracking, and inventory purposes throughout the time that an article is stored in the cluster server 1. Metadata information may include, but is not limited, to an article's message-id, message number, storage location(s), newsgroup information, redundancy number from the primary cluster server and specified redundancy number, and the original article receipt date. The expiration logs are stored in time ordered files based on when each article first arrived in the feeder cluster 110. The expiration log provides a means to determine a rough first-in-first-out (FIFO) method of expiration. It is understood that in some embodiments of the invention articles may not expire, get deleted from or written over in storage due to the article's extended popularity in the usenet or within a specific usenet group.

Figure 5:
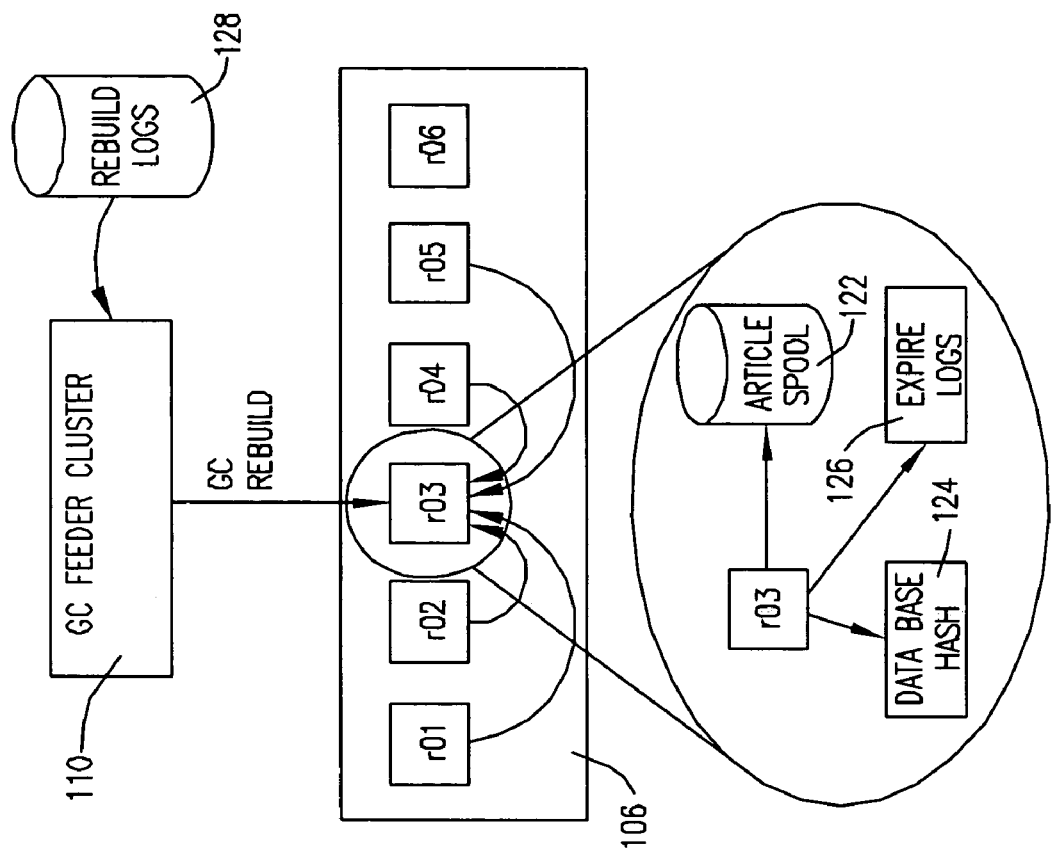
FIG. 5 is a block diagram depicting a method for rebuilding a cluster server in accordance with an embodiment over the present invention.

Referring to FIG. 5, when a cluster server crashes or loses necessary data, an exemplary method for rebuilding the storage on the crashed cluster server is used when the cluster server (or a replacement) comes up or online again. FIG. 4 depicts an exemplary technique for rebuilding the article storage of a cluster server in accordance with an embodiment of the present invention. The rebuild process may be initiated by the feeder cluster 110. The feeder cluster 110, after noticing that a down cluster server has become operational, scans the most recent rebuild log 128 file for articles that should be stored on the cluster server that has become operational. The feeder cluster 110 instructs the newly operational cluster server (e.g., cluster server 3, r03) to retrieve the indicated articles from its peer cluster servers (e.g., cluster servers 1, 2, 4 and 5). Along with an article-id, the rebuild process also provides the cluster server information on which direct peer cluster server(s) should have the needed articles in storage, the time stamp of the original delivery of the article to the usenet system 100, and the originally prescribed redundancy value for the cluster server and the article.

The cluster server 3, then connects to the peer servers 1, 2, 4, and 5, specified by the rebuild process, and retrieves and stores the article(s). Each retrieved article is stored on cluster server 3's article spool 122. The article's metadata is added to the memory index (data base hash) 124 and the expiration logs 126. Again, the time that the article was originally delivered to the usenet 100, specified in the exemplary rebuild process, is used to place the article in proper order within the expiration log 126.

In another aspect of the present invention, the server cluster 106 cluster servers may be configured to provide varying amounts of storage redundancy depending on the age of the article. When a cluster server is fed an article (either by a direct feeder cluster feed from usenet peers or via a cluster server rebuild process), the cluster server receiving an article is always provided the redundancy value for each specific article. If the age of the article is relatively young or new then the redundancy value may be a larger number than when the age of the article is relatively old. One reason for having a higher redundancy for new articles is because requests for new articles tend to be higher than requests for old articles. Providing an article to multiple users during a short period of time can be more easily accomplished when a plurality of different cluster servers can be called on to provide the same article. An exemplary redundancy configuration may be that for articles less than 3 days old, the redundancy value is set to 5; for articles between 3 and 7 days old, the redundancy value is set to 4; for articles greater than 7 days old, but less than 14 days old, the redundancy value is set to 3; and for articles 14 or more days old the redundancy value is set to 2.

When storage space on a cluster server is needed for the storage of new articles, each redundancy level is checked. Articles that have aged and have decreased redundancy values are deleted from cluster servers that are at the end of the redundancy chain (e.g., if the redundancy value for an aged article changed from 3 to 2 and the primary cluster server is cluster server 1 with redundant copies of the article on cluster servers 2 and 3, then the redundant article on cluster 3 is deleted). In another example found in FIG. 6, if article <A> has aged 8 days (is eight days old) and was stored on cluster server 1 with a redundancy of 5 (because when article <A> was stored it was less than 7 days old) and new article <B> needs to be stored on cluster server 5, but no storage space is available, then cluster server 5 can delete the $5^{th}$ redundant copy of article <A> on cluster server 5 and copy new article <B> to primary cluster server 5 along with the redundant copies of the articles being copied to cluster servers 6, 1, 2, and 3 so that the redundancy value of 5 is met for new article <B>.

In order to better describe the interaction between the feeder cluster 110 and the server cluster 106, it is important to understand that the main reason for the feeder cluster 110 to interact with the server cluster 106 is for the purpose of storing articles on specified or determinable cluster servers. The feeder cluster servers of an exemplary giga cluster 100 use a modified IHAVE command to send an article from a feeder server to a designated cluster server. The modification to the IHAVE command sends extra metadata than an unmodified IHAVE command would send. The extra metadata sent by the exemplary modified IHAVE command can include, but is not limited to, the redundancy value of this instance of the article and the original time the article first arrived in the feeder cluster 110.

Referring to FIG. 7, once a feeder server feeds an article to a single cluster server, the feeder server can use an exemplary GETTHIS command with the same metadata used by the modified IHAVE command to have subsequent cluster servers retrieve and store the article from a peer cluster server in the server cluster 106. Ideally the feeder cluster is only required to copy a new article to the server cluster 106 once so that the feeder cluster can use more of its processor bandwidth to service the enormous amount of incoming new articles from usenet peers 108. The cluster servers can focus on organizing, updating, overwriting, deleting, and providing articles to users.

In common usenet systems every article stored and uniquely identified by a message-id must be assigned a unique article number for every newsgroup the article is posted to. In prior art usenet services, message-id and stored article number matching/assigning have traditionally been a data bottleneck problem and a high probability point of failure. Embodiments of the present invention remove this bottleneck and point of failure problem by numbering articles "out-of-band".

In order to number each article in each newsgroup out-of-band, the feeder cluster 110, when receiving a new article from the usenet peers 108, sends the article's header to a single designated numbering server referred to as the numbering master server 140. The numbering master server 140 can be a stand alone server or be a header server in the header cluster 114. All the other header servers are referred to as "numbering slaves" with respect to the numbering master server. Only one server can be the numbering master server 140.

The feeder cluster 110 sends received articles to the server cluster 106 without the "X-Ref" portion of the header associated with each article. The X-Ref header is used to indicate to the cluster servers an article's article number within a newsgroup. This is an important aspect of an embodiment of the invention because the incoming article can proceed from the feeder cluster 110 to the server cluster 106 without delay, bottleneck or numbering failure because the numbering master server 140 is dedicated to establishing the article number to be used within the giga cluster for each and every article. The feeder servers 112 are configured to receive the articles and provide them to the cluster servers (1-32) without X-Ref headers, while, at substantially the same time, the feeder servers 112 also provide the header information for each article to the numbering master server 140. The numbering master server 140 provides an X-Ref article number for each header, then gives the numbered X-Ref header back to the feeder cluster 110 for dissemination to both the header cluster 114 and the server cluster 106. The cluster servers (1-32) attach the X-Ref number information onto the appropriate, previously stored, unnumbered article. In some embodiments of the invention, the X-Ref information can theoretically arrive in its designated cluster server(s) before the matching unnumbered article is stored in the same cluster server(s). In essence, the order of storing the X-Ref article number and the unnumbered article in the cluster servers does not matter.

To repeat, the numbering master server 140 sends the numbered information back to the feeder cluster 110 who then passes the header information for each article header received to the real servers where the article was stored in the server cluster 106. The numbering master server 140 or the feeder cluster 110 then also may pass the header information for each article header received to the header servers 116 in the header cluster 114.

In yet another embodiment, a cluster server 106 can implement the modified IHAVE command in such a way that the cluster server 106 implicitly attempts to retrieve the article from the server cluster 106 before sending a newly received article to a determined cluster server. If the article is present in the server cluster 106, then the server cluster informs the feeder server that it already has a copy of the article. Thus, the feeder server does not have to send the newly received article data. This technique saves time and microprocessor bandwidth.

As discussed above, pieces of the header of each article, stored in the server cluster 106, is stored in the header cluster 114. The feeder cluster 110, depicted in FIG. 8, used an IHAVE feed to send the header cluster 114 a data feed containing only the header of each article. The header cluster 114, header servers 116 store the provided header information, which will be used in the future for article retrieval. The header data is generally metadata extracted from each stored article. The metadata store is necessary to index the articles in the server cluster 106 so that the articles can be found and provided to news clients who request the articles.

Figure 9:
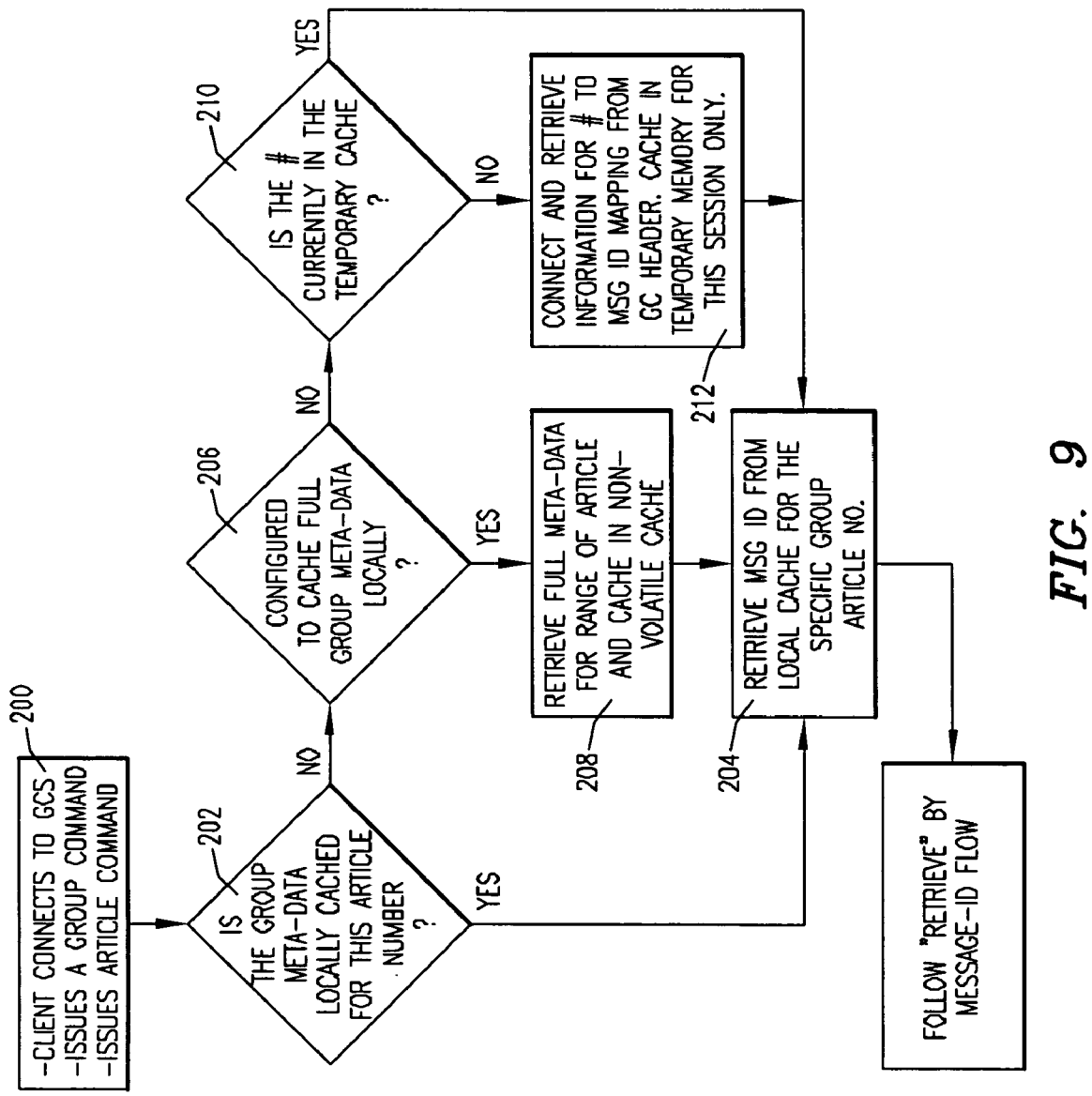
FIG. 9 is a flow diagram depicting an exemplary method for allowing a client to request a list of news articles and/or receive a message-id or number for a particular news article.

For a moment let's shift the focus from saving and storing articles to retrieving one or more articles from the exemplary usenet system 100. Referring to FIGS. 1 and 9, an exemplary technique for retrieving article information by a customer is provided. A customer 102 connects to the cluster server 106 via an internet connection that at some point in the connection preferably becomes an NNTP connection 104 to the server cluster 106. The client 102 connects with a cluster server (i.e., 1-32) in the server cluster 106. Via, for example, a Usenet browser, the client 102 uses a group command to select a specific newsgroup of interest. The customer 102 then requests the metadata for all, or a portion, of the articles in the selected newsgroup. To request the metadata, the client may use the XOVER, OVER, XHDR, HDR, or LIST group command(s), or any other command that queries metadata of articles in the selected newsgroup.

The cluster server that is in communication with the client, checks it's cache memory (local cache) to determine if metadata associated with the selected newsgroup is already cached and up to date locally. If the metadata for the specified newsgroup articles is in the local cache of the cluster server, then the metadata is read and sent to the customer 102 so that the customer can select an article of interest in the selected newsgroup. If metadata associated with the customer selected newsgroup is not cached or up to date in the cluster server's local cache memory, then the cluster server connects to the header cluster 114 and retrieves the customer requested metadata via the NNTP header retrieval connection 130 for the newsgroup articles. If the requesting cluster server is configured to locally cache the retrieved metadata, then it will cache the metadata as the metadata is passed to the customer.

Still looking at FIG. 9, once a customer 102 looks at the listing of articles in their selected newsgroup of interest. The customer 102 can then select an article to view from a resulting list of articles for the selected group. The cluster server, which is connected to the customer 102, determines where the selected article is located. The processes of procuring an article to read starts at step 200. The customer 102 connects to the server cluster 106 and issues both a group command (indicating the newsgroup the article of interest is associated with) and an issue article command (indicating the article number within the specified group). At step 202, the cluster server checks its local cache to determine if the group and article number is stored therein. If the group/article number is stored in the cluster server's local cache, then at step 204 the message-id for the specific group/article number is retrieved from the local cache.

In this specification it should be understood that a message-id is a string of characters that uniquely identifies an article in Usenet. Furthermore, a group/article number (message number) is an article number associated with an unique article within a newsgroup in the Usenet. A Usenet article can be posted in multiple newsgroups. The article will have a unique message-id, but in each newsgroup the article will have a different group/article number.

On the other hand, if back at step 202 the selected group's metadata is not stored locally on the cluster server, then at step 206 it is determined whether the cluster server is configured to locally cache all the metadata associated with a group. If the cluster server is configured to cache all the metadata associated with a newsgroup, then at step 208, the cluster server reaches out to the header cluster via an NNTP header retrieval connection 130 in order to receive the complete metadata for a specified or predetermined range of articles about the customer selected group/article number. The retrieved range of metadata is stored locally in a non-volatile cache memory on the cluster server. The non-volatile memory may be a hard-drive, optical drive, flash memory or other type non-volatile memory. At step 204, the message-id for the selected group/article number is retrieved from the local non-volatile cache memory.

Backing up again to step 206, if the cluster server is not configured to locally cache the metadata associated with a customer chosen group, then at step 210, the cluster server checks to determine if the group/article number chosen by the customer is in the temporary cache memory of the cluster server. If it is in the temporary cache memory, then at step 204 the message-id can be retrieved from the local or possibly temporary cache for the specified group/article number.

Back at step 210, if the article number cannot be found in the cluster server's temporary cache memory, then at step 212 the cluster server communicates via the NNTP header retrieval line 130 with the header cluster 114. The cluster server requests and retrieves a subset of the metadata information for the group/article number including at least the message-id for the group/article. The retrieved information is placed in a temporary memory (or temporary cache) of the cluster server. At step 204 the cluster server retrieves the message-id for the purpose of retrieving the article via its message-id.

Figure 10:
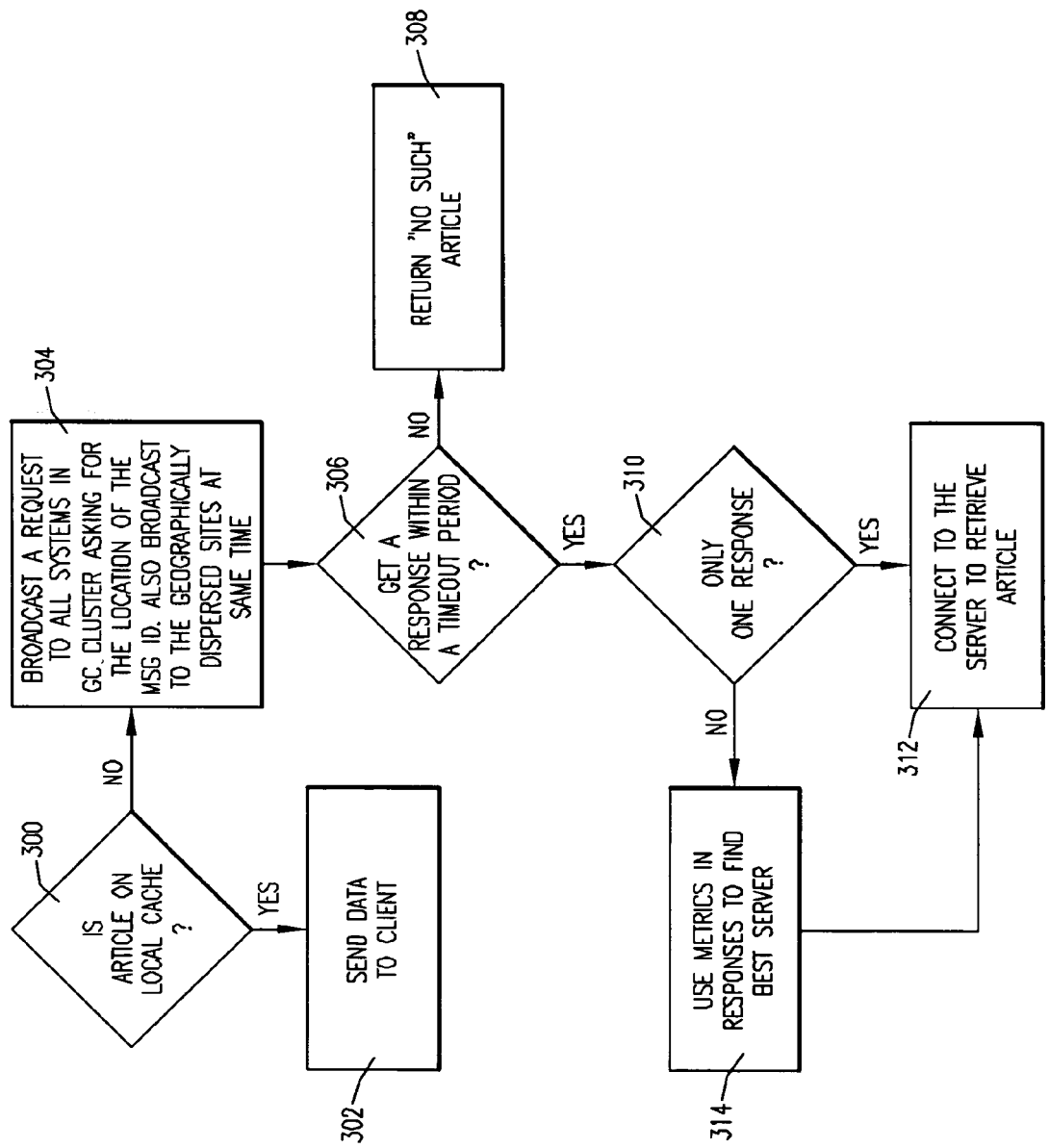
FIG. 10 is a flow chart depicting a method allowing a client to retrieve an article by message-id.

FIG. 10 discloses a flow diagram for an exemplary technique for retrieving an article via its message-id in accordance with the invention. At step 300, the cluster server that is retrieving a specific group/article uses the message-id to check if the article is stored in the cluster server's local cache. If the article is in the cluster server's local cache, then the article is sent to the customer at step 302. If an article having the specific message-id is not stored in the cluster server's local cache, then at step 304 the cluster server broadcasts a request to all cluster servers in the server cluster 106. The request is for any cluster server in the server cluster 106 that is storing the article having the requested message-id to reply. If the gigacluster 100 is clustered with other giga cluster (i.e., 100*b*), the cluster server may broadcast the request to other giga cluster systems as well.

At step 306, the cluster server that sent the request out waits a predetermined amount of time (a time out period) for one or more responses from other cluster servers that have the article with a matching message-id. If no responses to the request are received in the predetermined amount of time, then at step 308, the requesting cluster server sends a "no such article" to the customer to indicate that the requested article is not in the server cluster 106.

If a response is received by the requesting cluster server and it is the only response received (step 310) within the predetermined time period, then the requesting cluster server is placed in communication with the cluster server that has the article for retrieval and for providing the requested article to the customer (step 312). The requesting cluster server may also store the retrieved article within its cache memory for possible future use.

If, at step 310, more than one cluster server responds to the requesting cluster server, then at step 314 metrics are used to determine which responding server is the best server to send the requested article having the designated message-id. Some of the metrics that may be considered are CPU load, average article read latency, average article throughput, etc. After selecting the best cluster server for providing the article, the requested article is sent to the requesting cluster server at step 312.

As discussed previously with respect to FIG. 1, giga clusters 100 and 100*b* can be clustered together with other giga clusters. Each giga cluster can be separated geographically (be distant from each other). Multiple giga cluster sites can support one another by supplying jointly stored articles to customers at either site. As shown in FIG. 10, step 304, the broadcast from a cluster server (i.e., 1-32) to all the cluster servers in the local giga cluster 100 can be modified to broadcast to all the cluster servers in all clustered giga clusters 100, 100*b* (i.e., 100*c* . . . 100*i*, not specifically shown). Typically, the cluster servers in the local giga cluster 100 will have the fastest response time for supplying a requested article. Thus, a local cluster server is more likely to be selected, based on metrics, to provide a message-id'ed article to a requesting cluster server. However, if the requested message-id'ed article is for some reason not available on the local giga cluster, then via giga clustering a plurality of giga clusters, the message-id'ed article can be transparently retrieved for a non-local giga cluster for a customer.

Figure 11:
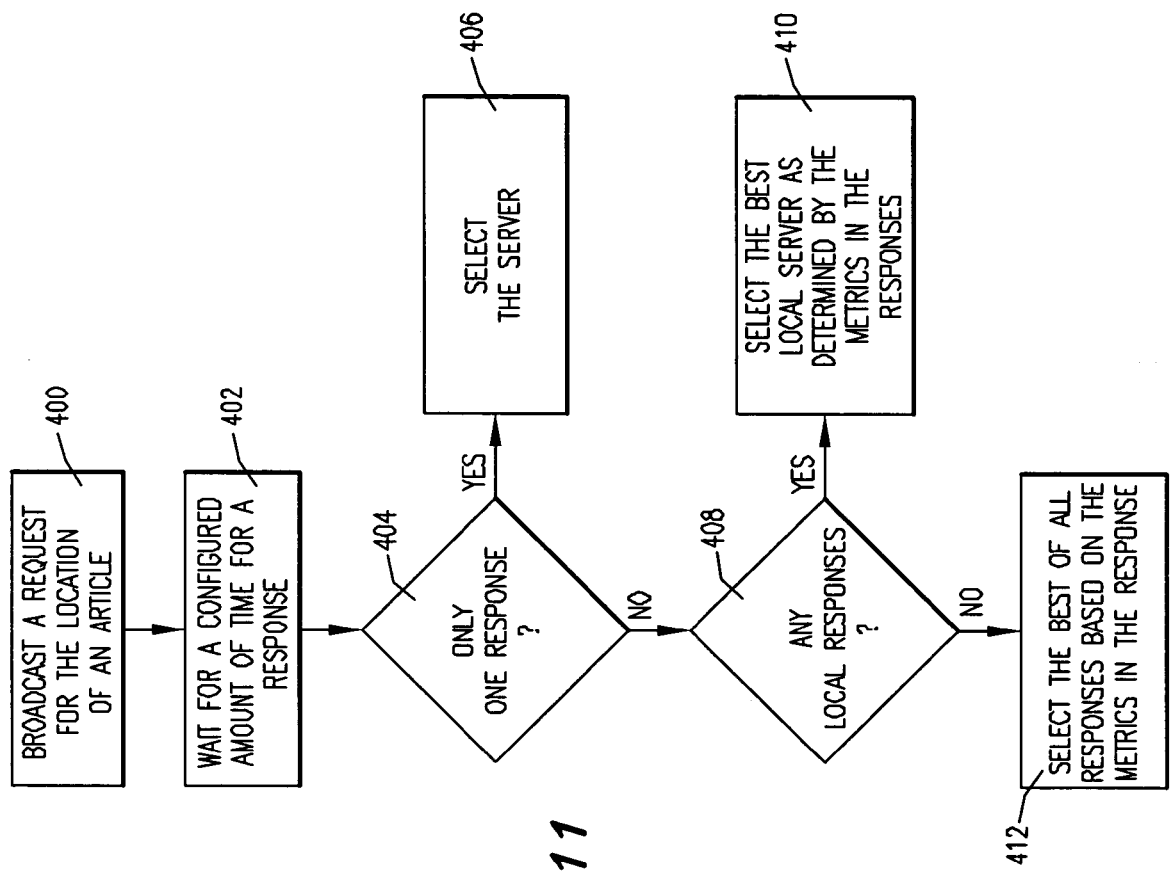
FIG. 11 depicts a block diagram supporting geo-clustering wherein multiple gigacluster sites support one another by supplying articles for clients on either site.

FIG. 11 depicts a flow chart providing an exemplary method for retrieving a message-id'ed article for either a local or non-local cluster servers. At step 400 the cluster server that is in communication with a customer broadcasts a request for a location of a requested article (that has a determined message-id). The broadcast is made to the cluster servers in the local giga cluster 100 and to the cluster servers of non-local or clustered giga clusters. The broadcasting cluster server waits for a configured amount of time for responses from the other cluster servers at step 402. At step 404, if only one response is received by the broadcasting cluster server, at step 404, in the configured amount of time, then the cluster server that responded is selected regardless of whether it is a local or non-local cluster server at step 406. The requested article is then received from the responding cluster server and provided via the requesting cluster server to the customer. The requested article may also be stored in a cache memory of the requesting cluster server.

If more than one response is received by the broadcasting cluster server at step 404, then at step 408, the broadcasting cluster server determines if any of the received responses are from local cluster servers. If one or more of the received responses are from a local cluster server, then at step 410, the best local server is selected to provide the requested article to the broadcasting cluster server based on various metrics of the response. The metrics used to determine which of the local cluster servers is the best suited to provide the article to the broadcasting cluster server include CPU load, average article read latency, average article throughput, etc At step 408, if none of the responding cluster servers are from local cluster servers, then the broadcasting cluster server must use metrics to determine which of the non-local cluster servers is the best one for delivery of the requested articles at step 412. Once the best non-local cluster server is determined, the article is sent to the requesting cluster server. Non-local cluster metrics additionally include the network latency between the requesting cluster server and the responding non-local cluster server.

From time to time, a header cluster 114 performs an article inventory and maintenance function. The header cluster determines what the lower boundary of the article numbers for each group. As time passes older articles are either deleted or written over by newer articles. For each newsgroup, the header cluster will determine the lowest article number. To do so, the header cluster will check for an article number that is approximately 1% larger than a previously determined lower article number boundary. If an article for the 1% larger article number is found, then a binary search is performed that counts down article numbers for the selected group in order to determine the exact lower boundary of the article numbers for the specific group. If the article for the 1% larger article number is not in the cluster servers, then the header server will increase the lower boundary for article number and test again for an existing article that matches the new 1% larger article number.

In a further embodiment of the invention, the different newsgroups or article groups are classified by using both a major classification code and a minor classification code. For example, a newsgroup may be classified as "Sf" wherein "S" is the major code and "f" is the minor code. The major code generally indicates major aspects of a newsgroup. For example, the "S" may stand for "sports" newsgroup. The minor code may be a species of the major code, for example, the "f" may stand for "football" which is a subgroup of the sports.

When the classification codes are used, they are matched to a full major-minor classification pair. If no major-minor pair is found, then a default for the major code is used.

Exemplary embodiments of the invention can utilize classification codes to enable limitations on a customer's visibility of the articles retained in a giga cluster usenet system 100. Stated another way, embodiments of the invention can be configured to allow different customers complete or less than complete views of specific newsgroups and newsgroup article lists. Articles that are stored in the server cluster, may not be available to a customer depending on the customer's subscription, membership type, age, or other criteria, to the usenet service provider.

A customer may connect to an exemplary giga cluster usenet system of the present invention and authenticate himself either via a username/password function or by the client IP address. The customer connects to the server cluster 106 and therein to one of the cluster servers. Each cluster server, within the server cluster 106, can connect to the authentication server 113 in order to authenticate that the customer is associated with a Usenet client. A customer is an individual or user of an ISP or a client's services. A client is an ISP, cable company, communication company or other entity that provides a communication means for a customer to connect to and use the internet.

When the customer is authenticated, the authentication server 113 can provide "visible retention" configuration variable(s) to the cluster server servicing the customer. The visible retention variable may be, for example, a string similar to "M=50%, S=80%, T=90%". The retention variable string tells the cluster server that the customer is only allowed access to a specified percentage of articles in selected newsgroups having the specified major codes (M, S, T, etc.). For example, assume customer A is signed onto the usenet service provider and customer A's subscription allows viewing of the sports newsgroup "S"; then if the newest article in the sports newsgroup is numbered 2000 and the oldest article is numbered 1000, then customer A would only be able to view sports group articles 1201 through 2000 (S-80% of the articles). Alternately the visible retention variable may be a string similar to "M=30d, S=40d, T=180d" where the unit 'd' represents a visible retention in days.

In further embodiments the actual retention of articles can be adjusted for each newsgroup (major and/or minor newsgroup). Instead of operating like prior art usenet systems wherein all articles expire after reaching a preset age regardless of what newsgroup the article belongs too, embodiments of the present invention can define specific retention parameters for each newsgroup if necessary. For example, if there are three newsgroups (S, M and E), there can be different retention rules for each newsgroup such that all the cluster servers in the server cluster will expire articles for the groups at a specified time. If group S has a retention period of 20 days, group M has a retention period of 25 days, and group E has no defined retention period; then the server cluster (when additional storage space is needed to store new articles) will first remove or write over articles from group S if they are older than 20 days, then articles from group M if they are older than 25 days, and lastly, articles from group E (since there is no defined retention period).

Other parameters that can be used to define newsgroup retention rules include allowing a view of a maximum number of newsgroup articles, a maximum amount of storage space allowed (for storing the group articles), a number of days, or combinations thereof. Therefore a newsgroup "X" may have retention limitations requiring that the maximum amount of time an article can be stored is 20 days and the maximum number of articles that can be stored is 10,000. Thus, if a stored article in newsgroup X is older than 20 days or if there have been 10,000 articles stored in group X since the article was stored, then the article can be deleted or written over.

Exemplary usenet giga clusters 100 may have an additional technique for handling the catastrophic failure of a cluster server 112 or a diagnostic event indicating that a catastrophic failure of a cluster server 112 is imminent. Redundant storage of articles in a plurality of cluster servers has already been discussed, but an exemplary server cluster 106 may have an additional technique for handling the loss of an entire cluster server as opposed to the loss of storage drive(s) on a cluster server. If a cluster server goes down or indicates that it is about to go down or crash (due to normal server maintenance or an unexpected failure), all the remaining cluster servers 112 in the server cluster 110 can be used to store the articles of the failed or failing cluster server. Unlike prior systems wherein a single alternate server is designated to store the article from the failed or failing cluster server, an exemplary server cluster will spread the failed (failing) server's articles substantially evenly among all the cluster servers in the server cluster in a round-robin fashion. It is understood that the articles that were stored on the failed cluster server cannot be copied from the failed cluster server, but instead can be copied from the redundant article locations on other cluster servers.

When the articles from the failed or failing cluster server are provided to the other cluster servers in the cluster, the articles are identified as being from the specific failed or failing cluster server and are to be stored for rebuild purposes. The cluster servers store the metadata for the articles in a designated file or location to indicate the articles are for a rebuild.

After the failed cluster server is stabilized or replaced and is ready to resume operation, the stabilized cluster server undergoes a cluster server rebuild process wherein the articles stored in the various other cluster servers are copied to the stabilized cluster server in a newest articles first order. This is referred to as back filling the stabilized cluster server because the copying takes place in the reverse order that the articles were originally stored. Meanwhile, the stabilized cluster server is receiving and storing new articles from the feeder cluster as new articles designated for the stabilized cluster server are received. The back filling is done because it has been shown that the newer a usenet article is, the more often it is requested by customers.

This technique of rebuilding a cluster server spreads the work of rebuilding over all the cluster servers in the cluster thereby lessening a drain of resources from a single cluster server that contains all the "back-up articles". Furthermore, the limitation of how much can be backlogged when a cluster server does down is greatly increased over being limited to a single backlogging server. Also, this rebuild technique is advantageous because it doesn't copy the articles onto the stabilized or new cluster server from oldest to newest, thereby copying the last needed articles first.

Once the stabilized or new cluster server is rebuilt (i.e., contains both new recently received articles from the feeder cluster and is rebuilt with the most recent articles from the backlogged articles), then the other cluster servers in the cluster are instructed to purge the backlogged articles (along with corresponding metadata) that was stored/backlogged for the failing server's rebuild.

In prior art systems, the Radius protocol was used to allow a customer to dial in on a modem to a modem bank. A modem bank is essentially a rack full of modems that are configured to allow each dial in customer to be connected, via an Ethernet network to a prior art Unix server or any computer or server that implements the Radius protocol. The Unix server belonged to any one of a number of internet connection vendors (e.g., Cisco, 3Com, Lucent, etc.). The Unix server acted as a Radius server because it ran a Radius daemon. When the customer dialed in, in order to make a connection to the Unix server, the customer was challenged or queried for some kind of authentication credentials at the modem rack (e.g., user name, password). The customer entered the credentials and the modem rack formatted the credentials into a packet of data. The packet of formatted credentials were sent to the Unix server. The modem rack used a program that formatted the credential packet using a specific Radius protocol for the Unix server (Radius server). Radius is short for Remote Authentication Dial-In User Service and is a standard protocol used in an authentication and accounting system used by many ISPs. The modem sent the credential packet to the Unix server which was operating as a Radius server. The Unix server (Radius server) checked to determine if the information in the credential packet was acceptable and then either authorized or denied access to the ISP's system. The modem rack, based on the authorization or denial of access by the Unix server (Radius server) could then connect the customer to the ISP.

In an embodiment of the present invention, the customer or client connects to the giga cluster 100 using a TCP/IP connection. The Radius protocol is utilized as a mechanism to authenticate a customer or client. In other words, an embodiment of the present invention allows a customer 102 to connect to a server cluster 106 via a TCP/IP connection, wherein the server cluster requests 106 and receives the customer's credentials (i.e., user name, password). The server cluster 106 packages the customer's credentials into a data packet in accordance with the Radius protocol. The data packet is sent to a customer's Radius server, which is outside the exemplary giga cluster usenet system 100. The customers are generally ISPs, cable companies, DSL providers and the like. The Radius server 142, which could be a Unix server, windows server, Lenix, Novell, NT or any type of network server, authenticates the data packet and sends a response back to the exemplary giga cluster's server cluster 106. The cluster server then decides what to do with the customer based on the response from the Radius server (i.e., connect the customer, provide a predefined limited view of the usenet database, reject the connection, etc.). This technique of authenticating a customer through the server cluster 106 to the customer's Radius server answers a long felt need in the industry to advance the technology by decreasing or better enabling control of the cost to an ISP client by being able to control and regulate any customer's usage of the Usenet. In particular, an ISP can set limits on the amount of data/articles that a user downloads to the Usenet (an ISP (client) pays the Usenet service by the amount of data that is downloaded to the Usenet). Furthermore this exemplary technique of authenticating a customer simplifies the integration of the customer's use of the Usenet by not requiring the Usenet service provider to store massive amounts of information provided from different ISPs so that the Usenet Service provider could regulate usage of the Usenet by the various ISP's customers based on large files provided by each ISP.

In an exemplary embodiment, the customer connects to the exemplary giga cluster usenet system 100 via a NNTP/TCPIP connection 104, credentials are requested, authenticated (either in the giga cluster out 100 or via an external server), then the exemplary giga cluster 100 can determine what type of subscription, service, or access to the usenet service the customer can have. This is all done by the cluster server to which the customer is connected to. It should be understood that this particular embodiment of the present invention does not specifically use the customer's IP address to authenticate the customer.

In other embodiments of the present giga cluster usenet system 100, LDAP is used to authenticate a customer. LDAP, short for Lightweight Directory Access Protocol, is a set of protocols for accessing information directories. LDAP, like Radius, is another authentication protocol, but unlike Radius, LDAP directly supports TCP/IP, which is necessary for any type of internet access. Other authentication protocols and services may also be used in various embodiments of the invention. LDAP is an open protocol that allows an application to not be concerned with what type of server is hosting the directory. LDAP can also be used for a variety of other functions besides authentication. LDAP can be utilized as a directory service or directory data base that is very adaptable to storing the many customers of an ISP client, or other type of client. LDAP enables embodiments of the invention to utilize the functionality and additional data that can be placed in LDAP data packets. Such functionality and space for data content in an LDAP packet far exceeds the usefulness of the Radius protocol. Exemplary embodiments can use relational information that establishes relationships between specific customers, newsgroups, and other customers. Newer ISP's no longer use the Radius protocol, as such usenets that interact with ISP's must adapt to the LDAP protocol. An exemplary giga cluster usenet system also utilizes the database structure of LDAP to improve and streamline customer interfaces.

Furthermore, exemplary gigacluster usenet systems may be adapted to accept and connect to both Radius and LDAP protocol systems. Furthermore, LDAP is used by other present invention embodiments to authenticate a customer who is using packet data with a wireless communication/internet device such as a PDA, phone, automobile, laptop computer, to name only a few.

When using LDAP in an embodiment of the present invention, a customer connects to the server cluster 106. The server cluster 106 sends an authentication request to the authentication server 113. The authentication server, based on some minor data found in the customer's connection data, determines to which client of the Usenet service the customer belongs. Furthermore, the authentication server 113 determines whether the client to which the customer belongs is configured to authenticate its customers via LDAP. The authentication server 113 acquires the client's LDAP server and queries for the customer's account information and authentication requirements. The authentication server 113, after receiving the requirements for authentication from the client's LDAP server compares the authentication information received from the customer with the authentication information received from the client. The authentication server 113 then responds to the cluster server by indicating whether the customer is authenticated and, if so, the associated usage allowances or limitations that the client has placed on the customer's use of the Usenet.

The previous description for preferred embodiments for implementing the invention, and the scope of the invention should not necessarily be limited by this description. The scope of the present invention is instead defined by the following claims.

What is claimed as new and desired to be protected by Letters Patent of the United States is:

1. A system comprising:
    a feeder cluster comprising a plurality of feeder servers, each of the plurality of feeder servers being in communication with at least one other of the plurality of feeder servers, the feeder cluster receiving a plurality of articles and associated headers from at least one source outside of the system;
    a server cluster comprising a plurality of cluster servers, each of the plurality of cluster servers being in communication with at least one other of the plurality of cluster servers, the server cluster receiving from the feeder cluster and storing the plurality of articles and at most a portion of the plurality of headers associated with the plurality of articles;
    a header cluster comprising a plurality of header servers, each of the plurality of header servers being in communication with at least one other of the plurality of header servers, the header cluster receiving from the feeder cluster and storing the plurality of headers associated with the plurality of articles and not storing the plurality of articles;
    and wherein a given associated header of the plurality of associated headers comprises metadata associated with an article of the plurality of articles; and
    wherein the plurality of feeder servers read a article's message-id and determine a specific cluster server, of the plurality of cluster servers, that is to receive the article associated with the article message-id.

2. The system of claim 1, wherein said at least one source comprises a usenet peer system.

3. The system of claim 1, wherein the server cluster has a data connection with at least one customer.

4. The system of claim 1, wherein the plurality of servers perform a hash of the article's message-id and use the hash result to deterministically select which cluster server(s) is to store the article.

5. The system of claim 4, wherein, based on the hash, the feeder cluster instructs the server cluster to redundantly store a particular article on at least one additional cluster server but less than all of the cluster servers.

6. The system of claim 4, wherein, based on the hash, the article is redundantly stored on more than one cluster server.

7. The system of claim 1, wherein each article is given an out-of-band article number by the header cluster, the out-of-band article number being a number unrelated to a article's message-id number.

8. The system of claim 1, wherein no backend servers are connected to the system.

9. The system of claim 1, wherein the feeder servers share the flow of articles from the source outside the system, the feeder servers using load balancing techniques to share the flow of articles.

10. The system of claim 1, connected to a second system that is configured the same as the system, the system and the second system being able to retrieve articles from each other.

11. The system of claim 1, wherein each one of the feeder servers, cluster servers and header servers operate the same program that allows a server to be configured to operate as at least one of a feeder server, a cluster server, and a header server.

12. The system of claim 1, wherein each the article comprises at least one of a written information, an audio information, and an video information.

13. A clustered server network for receiving, storing and retrieving data articles, the data articles each comprising header information and data, the clustered server network comprising:
    a feeder cluster for receiving the data articles from an external data article source;
    a header cluster for receiving data article header information provided from the feeder cluster and not storing the data articles, the header cluster organizing and storing the header information for the data articles;
    a server cluster for storing the data for each of the data articles and at most a portion of the data article header information, the data for the data articles being provided from the feeder cluster; and
    wherein header information for a given article of the data articles comprises metadata associated with the given data article; and
    wherein the plurality of feeder servers read a article's message-id and determine a specific cluster server, of the plurality of cluster servers, that is to receive the article associated with the article message-id.

14. The clustered server network of claim 13, wherein the header information comprises a message-id and wherein the feeder uses the message-id to deterministically select where in the server cluster the data associated with the header is to be stored.

15. The clustered server network of claim 14, wherein each data article is assigned an out-of-band article number by the header cluster, the out-of-band article number being unrelated to the message-id of the data article.

16. The clustered server network of claim 13, wherein the clustered server network allows a customer to communicate with the server cluster such that the customer can select a first data article to view, the customer having a subscription to the cluster server network that defines the types of data articles that the customer can view.

17. The clustered server network of claim 16, wherein the subscription defines a number of data articles that the customer can view.

18. The clustered server network of claim 16, wherein the server cluster uses an authorization service to aid a determination of the subscription.

19. The clustered server network of claim 13, wherein the feeder cluster comprises a plurality of feeder servers that are in communication with one another.

20. The clustered server network of claim 13, wherein the server cluster comprises a plurality of cluster servers, the data from each data article being stored redundantly on more than one cluster server.

21. The clustered server network of claim 20, wherein the number of redundant copies being stored is dependant on the age of each data article.

22. The clustered server network of claim 21, wherein the age of each data article is based on a date each data article was first received by the clustered server network.

23. The clustered server network of claim 20, wherein the feeder cluster deterministically selects which one of the plurality of cluster servers will be a primary cluster server for storing a first data article, and wherein a redundant first data article is stored redundantly in a second cluster server.

24. The clustered server network of claim 13, wherein the header cluster comprises a plurality of header servers.

25. The clustered server network of claim 24, wherein a predetermined header server establishes an out-of-band article number for each new data article received by the clustered server.

26. The clustered server network of claim 25, wherein the article number is not related to a data article's message-id, the message-id being a unique number assigned to each unique data article and found in the header of each data article.

27. The clustered server network of claim 13, wherein communication protocols are used to transfer data articles, header information and data about the clustered server network, the communication protocol comprises at least one of NNTP, FTP, SMTP, POP3, IMAP, HTTPS and HTTP protocols.

28. The clustered server network of claim 13, wherein the article comprises at least one of a news article, text, fonts, pictures, graphics, music, video clips, software, moving pictures and digital information.

29. A clustered server network comprising:
 a header cluster comprising a plurality of header servers, the header servers being for storing header information and storage location information for articles and not the articles;
 a server cluster comprising a plurality of cluster servers, the cluster servers being for storing the articles and at most a portion of the headers;
 a feeder cluster for receiving the articles from peer networks, the feeder cluster comprising a plurality of feeder servers, each feeder server providing header data to the header cluster and the articles to the server cluster; and
 wherein header information for a given article of the data articles comprises metadata associated with the given data article; and
 wherein the plurality of feeder servers read a article's message-id and determine a specific cluster server, of the plurality of cluster servers, that is to receive the article associated with the article message-id.

30. The clustered server network of claim 29, further comprising an authentication server in communication with the server cluster, the authentication server being for receiving an authentication request from the server cluster and for authenticating a customer as being allowed to use an aspect of the network.

31. The clustered server network of claim 30, wherein the authentication server is further configured to determine a relationship between a customer being authenticated and a client to which a customer is associated with, the authentication server communicating with a client server in order to receive authentication criteria for the customer.

32. The clustered server network of claim 31, wherein the authentication server is further configured to authenticate the customer based on a comparison of the authentication criteria received from the client server and authentication information received from the customer.

33. The clustered server network of claim 31, wherein the client server is at least one of an LDAP server and a Radius server.

34. The clustered server network of claim 29, wherein the aspect of the system comprises predetermined usage allowances including at least one of regulating the amount of data that can be downloaded from the system, regulating which newsgroups can be accessed, and regulating the age of data searched.

35. The clustered server network of claim 30, wherein the article comprises at least one of a news article, text, fonts, pictures, graphics, music, video clips, software, moving pictures and digital information.

36. The clustered server network of claim 29, wherein the feeder cluster receives articles and provides header data and articles using as least one of a NNTP, FTP, SMTP, POP3 IMAP and HTTP protocol.

\* \* \* \* \*